(12) United States Patent
Joergl et al.

(10) Patent No.: US 7,469,691 B2
(45) Date of Patent: Dec. 30, 2008

(54) EXHAUST GAS RECIRCULATION COOLER BYPASS

(75) Inventors: Volker Joergl, Ortonville, MI (US); John Shutty, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/636,094

(22) Filed: Dec. 8, 2006

(65) Prior Publication Data

US 2007/0144501 A1 Jun. 28, 2007

Related U.S. Application Data

(60) Provisional application No. 60/748,894, filed on Dec. 9, 2005.

(51) Int. Cl.
*F02M 25/07* (2006.01)
*F02B 47/08* (2006.01)
*F02B 33/44* (2006.01)

(52) U.S. Cl. .................. 123/568.12; 123/568.2; 60/605.2

(58) Field of Classification Search .............. 123/563, 123/568.11, 568.12, 568.2, 568.21; 60/605.2; 701/108
See application file for complete search history.

(56) References Cited

U.S. PATENT DOCUMENTS

| | | | |
|---|---|---|---|
| 4,249,382 A * | 2/1981 | Evans et al. | 60/605.2 |
| 6,053,154 A * | 4/2000 | Pott | 123/568.12 |
| 6,367,256 B1 | 4/2002 | McKee | |
| 6,932,063 B1 * | 8/2005 | Hu | 123/568.14 |
| 7,013,879 B2 * | 3/2006 | Brookshire et al. | 123/568.12 |
| 2004/0221831 A1* | 11/2004 | Chmela et al. | 123/301 |
| 2005/0028796 A1 | 2/2005 | Tussing et al. | |
| 2006/0137665 A1* | 6/2006 | Khair et al. | 123/568.12 |
| 2007/0089400 A1* | 4/2007 | Huang | 123/568.12 |

FOREIGN PATENT DOCUMENTS

| | | |
|---|---|---|
| DE | 199 24 920 A1 | 12/2000 |
| JP | 08 135519 A | 5/1996 |
| JP | 11 093781 A | 4/1999 |
| JP | 2000 097017 A | 4/2000 |
| JP | 2004 156572 A | 6/2004 |
| WO | WO 96/30635 A | 10/1996 |
| WO | WO 02/16750 A | 2/2002 |

* cited by examiner

*Primary Examiner*—Willis R Wolfe, Jr.
(74) *Attorney, Agent, or Firm*—Reising, Ethington, Barnes, Kisselle, PC

(57) ABSTRACT

A method including selectively injecting non-cooled exhaust gas into a primary air intake conduit at a first location; selectively injecting cooled exhaust gas into the primary air intake conduit at a second location; and wherein the second location is downstream from the first location with respect to the direction of gas flow in the primary air intake conduit.

23 Claims, 3 Drawing Sheets

EXHAUST GAS RECIRCULATION COOLER BYPASS

CROSS-REFERENCE TO RELATED APPLICATIONS

This application claims the benefit of U.S. Provisional Application No. 60/748,894, filed Dec. 9, 2005.

TECHNICAL FIELD

The field to which the disclosure generally relates includes exhaust gas recirculation systems including coolers and methods of operating the same.

BACKGROUND

The performance of a combustion engine can be improved utilizing a turbocharger including a turbine side and a compressor side. Improvement in the emissions from such a combustion engine can be achieved with exhaust gas recirculation. However, for low pressure exhaust gas recirculation systems, high flow rates of the exhaust gas being recirculated can lead to high compressor inlet temperatures. An exhaust gas cooler may be positioned to reduce the temperature of the exhaust gas prior to the compressor inlet. However, such systems can lead to condensation of water vapor in the exhaust gas and wherein the resultant water droplets damage the compressor wheel which is spinning at a relatively high rpm.

High pressure applications of exhaust gas recirculation provide a recirculation flow path for the exhaust gas before the exhaust goes through a turbocharger (if present). Coolers have been used in such high pressure recirculation systems, but under certain circumstances such systems may produce undesirable constituents in the gas or lead to undesirable engine performance.

SUMMARY OF EXEMPLARY EMBODIMENTS OF THE INVENTION

One embodiment of the invention includes a method of operating a breathing system for a combustion engine comprising selectively injecting non-cooled combustion engine exhaust gas into a primary air intake conduit at a first location, selectively injecting cooled combustion engine exhaust gas into the primary air intake conduit at a second location and wherein the second location is downstream of the first location with respect to the direction of flow of gases in the primary air intake conduit.

Another embodiment of the invention includes a product comprising: an exhaust gas recirculation line and a first exhaust gas cooler in fluid communication with the first primary exhaust gas recirculation line; a bypass line constructed and arranged to provide a flow path for recirculation exhaust gas around the cooler; and wherein the bypass line includes a first end constructed and arranged to be connected to a primary air intake conduit at a first location, and wherein the first primary exhaust gas recirculation line is constructed and arranged to be connected to the primary air intake conduit at a second location downstream from the first location.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
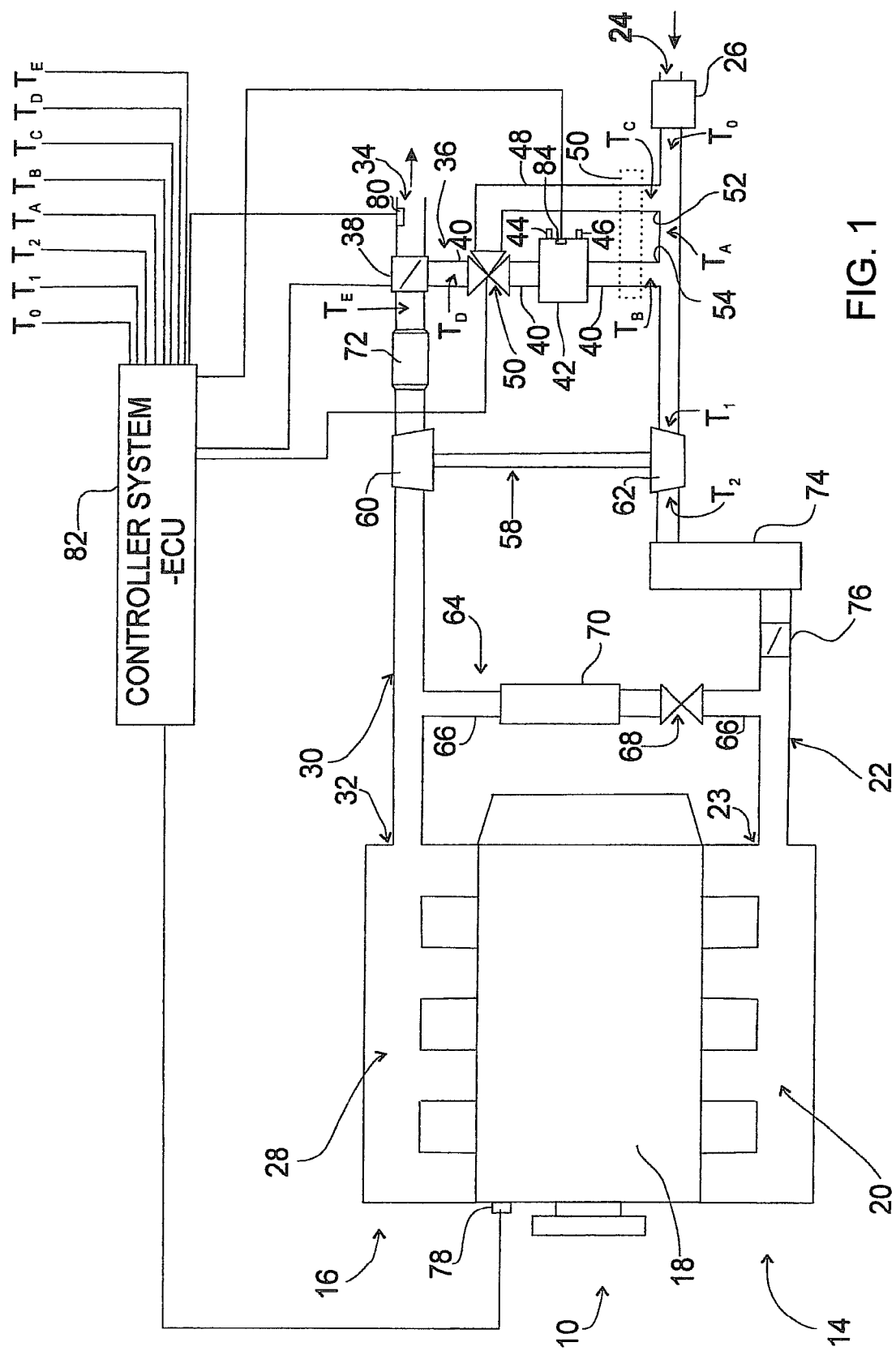
FIG. 1 is a schematic illustration of a product or system according to one embodiment of the invention.

Referring now to FIG. 1, one embodiment of the invention includes a product or system 10. The product or system 10 may include one or more of the following components. The system 10 may include a combustion engine 18 constructed and arranged to combust a fuel, such as but not limited to, diesel fuel in the presence of oxygen (air). The system 10 may further include a breathing system including an air intake side 14 and a combustion exhaust gas side 16. The air intake side 14 may include a manifold 20 connected to the combustion engine 18 to feed air into cylinders of the combustion engine 18. A primary air intake conduit 22 may be provided and connected at one end 23 to the air intake manifold 20 (or as a part thereof) and may include an open end 24 for drawing air therethrough. A filter 26 may be located at or near the open end 24.

The combustion exhaust side 16 may include an exhaust manifold 28 connected to the combustion engine 18 to exhaust combustion gases therefrom. The exhaust side 16 may further include a primary exhaust conduit 30 having a first end 32 connected to the exhaust manifold 28 (or as a part thereof) and having an open end 34 for discharging exhaust gas to the atmosphere.

The system 10 may further include a first exhaust gas recirculation assembly 36 extending from the combustion exhaust gas side 16 to the air intake side 14. A first exhaust gas recirculation (EGR) valve 38 may be provided in fluid communication with the primary exhaust gas conduit 32 and constructed and arranged to control the flow of exhaust gas out of the open end 34 of the primary exhaust conduit 30 and to control the flow of exhaust gas through a first EGR assembly 36. The first EGR assembly 36 may include a first primary EGR line 40 having a cooler 42 in fluid communication therewith for cooling the exhaust gas flowing through the first primary EGR line 40. The cooler 42 may include an inlet 44 and an outlet 46 to facilitate the flow of a coolant such as water or an anti-freeze fluid known to those skilled in the art. The coolant may be the same as that used to cool the combustion engine and may flow to the engine radiator or to a separate radiator. The first EGR assembly 36 may further include bypass line 48 constructed and arranged to allow exhaust gas to flow past the cooler 42. In one embodiment of the invention, the bypass line 48 is connected to the first primary EGR line 40 at a bypass valve 50. The bypass valve 50 may be provided in the first primary EGR line 40 upstream of the cooler 42. Alternatively, a bypass valve 50 may be positioned downstream of the cooler 42 and is constructed and arranged to control the flow of exhaust gas through the first primary EGR line 40 and the bypass line 48. In still another embodiment of the invention, the bypass line 50 may be directly connected to the primary exhaust conduit 30 and may include a control valve in the bypass line 48 or the primary exhaust conduit 30 for controlling the flow of exhaust gas through the bypass line 48.

The bypass line 48 connects to the primary air intake conduit 22 at a first location 52 which is downstream of the open end 24 of the primary air intake conduit 22. The first primary EGR line 40 of the first EGR assembly 36 connects to the primary air intake line 22 at a second location 54 which is downstream of the first location 52 but upstream of the compressor 62 (if present). As will be appreciated from the schematic illustration of FIG. 1, the temperature $T_C$ in the bypass line 48 at or near the first location 52 is greater than the temperature $T_B$ in the first primary EGR line 40 at the second location 54 after the exhaust gas has been cooled by the cooler 42. Incoming air entering the primary air intake conduit 22 through the open end 24 has an initial temperature $T_0$. The air flowing in the primary conduit 22 is warmed by the exhaust gas flowing through the bypass line 48 such that the temperature of the gases flowing in the primary air intake conduit 22 has a temperature $T_A$ at a position slightly downstream of the first position 52. The fresh air entering through the open end 24 and the exhaust gas in the bypass line 48 have sufficient time to mix prior to the cooled gas, from the first primary EGR line 40, entering the primary air intake conduit 22 at the second location 54. The first EGR assembly 36 and operation thereof may be utilized to control the temperature $T_1$ of the gases flowing in the primary air intake conduit 22 at a location downstream of the second position 54. The first EGR assembly 36 may be utilized for low-pressure exhaust gas recirculation and/or high-pressure exhaust gas recirculation.

In one embodiment of the invention the system 10 includes a turbocharger 58 having a turbine 60 in fluid communication with the primary exhaust conduit 30 and having a compressor 62 in fluid communication with the primary air intake conduit 22 to compress gases flowing therethrough. The first EGR assembly 36 is particularly well suited for this embodiment in that the first EGR assembly 36 can be utilized to control the temperature $T_1$ of the gas flowing in the primary air intake conduit 22 at a location just prior to the gas entering the compressor 62. Although it is desirable to cool the exhaust gas prior to entry into a compressor 62, such may result in the condensation of water vapor in the exhaust gas. The resulting water droplets may cause serious damage to the blades of the compressor 62 which is rotating at a relatively high rpm. Further, it has been discovered that connecting the bypass line 48 to the primary air intake line 22 upstream of the injection of the cooled exhaust gas, from the first primary EGR line 40, results in the warming of the incoming air to a temperature sufficiently above $T_0$. As such, the injecting of cooled exhaust gas from the first primary EGR line 40 into the primary air intake line 22 can be managed to substantially reduce or eliminate condensation.

Optionally, a second EGR assembly 64 may be provided for high-pressure exhaust gas recirculation. The second EGR assembly 64 may be identically constructed as the first EGR assembly 36 if desired. As shown in FIG. 1, in one embodiment of the second EGR assembly 64, a second EGR line 66 extends from the primary exhaust gas conduit 30 to the primary air intake conduit 22. A second EGR valve 68 is provided to control the flow of exhaust gas through the second EGR line 66. If desired, an EGR cooler 70 may be provided in fluid communication with the second EGR line 66 to cool exhaust gases flowing therethrough.

The system 10 may include a variety of further components as desired. For example, the primary exhaust gas conduit 30 may include additional emission components such as, but not limited to, a particulate filter 72 which may be positioned downstream or upstream of the turbine 60 and upstream of the first EGR valve 38. The air intake side 14 may include a second charge air cooler 74 upstream of the compressor 62 and a throttle valve 76 positioned in the primary air intake conduit 22, for example, at a location between the second charge air cooler 74 and the connection of the second exhaust gas recirculation line 66 to the primary air intake line 22. Furthermore, the system 10 may include a controller system 82, such as an electronic control unit, including memory devices and data processing devices. The controller system 82 may be electronically connected to at least the first EGR valve 38 and the bypass valve 50 to control the same in response to a variety of inputs. Such inputs may include, but are not limited to, a signal or data, such as engine speed and load provided from the engine by an engine sensor 78, or a signal or data provided regarding exhaust gas constituents such as the level of oxygen, $NO_2$ and particulate matter provided by an exhaust gas sensor 80. Temperatures $T_0, T_1, T_2, T_A, T_B, T_C, T_D$ and $T_E$ may be measured or calculated values and such information may be utilized by the controller system 82 to control the first EGR valve 38 and the bypass valve 50.

Figure 2:
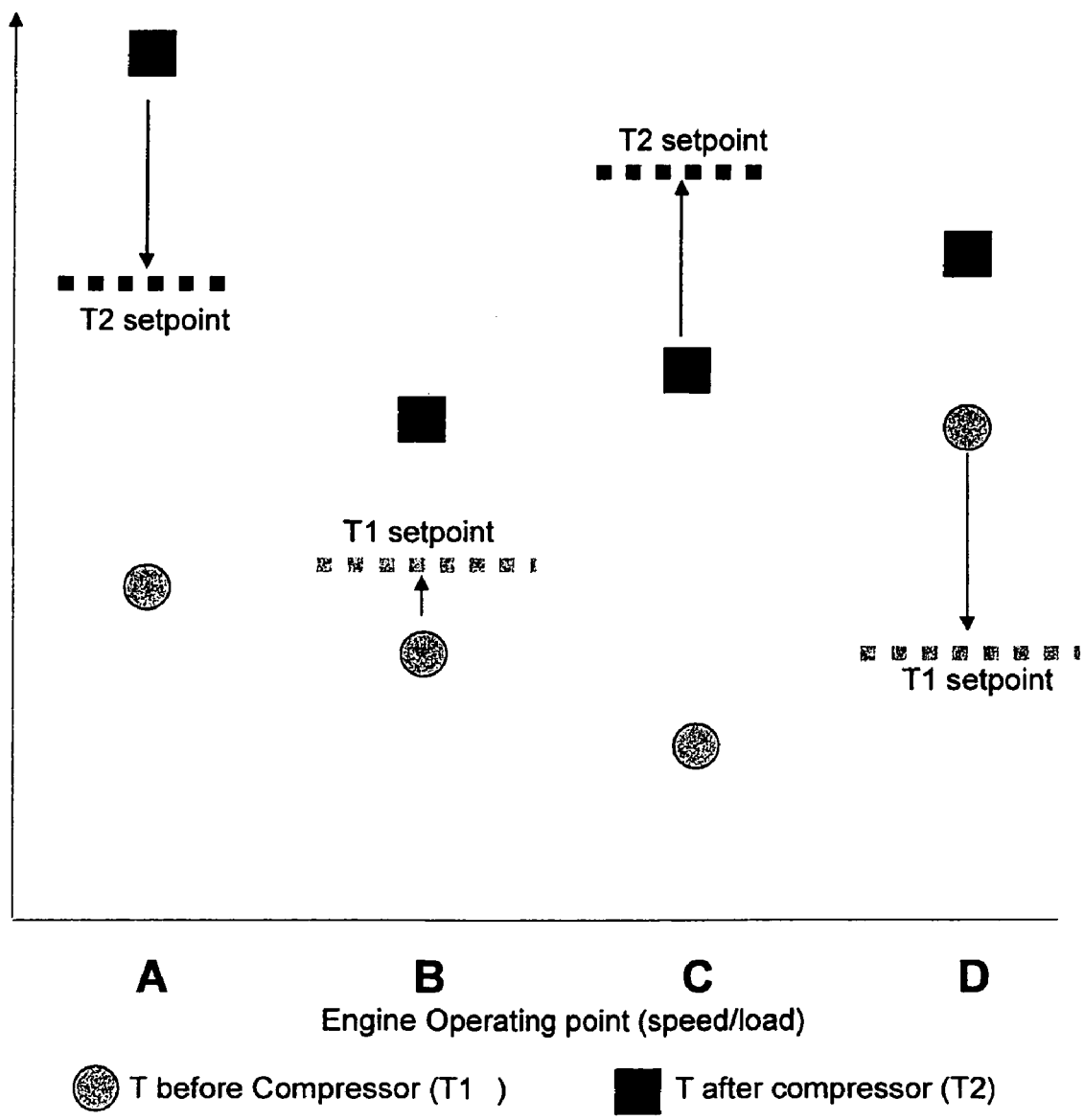
FIG. 2 is a graph illustrating the temperature and temperature set points over various engine operating conditions of a system according to an embodiment of the invention.

Referring now to FIG. 2, depending upon the speed and load (engine operating point) either $T_1$ or $T_2$ can be controlled utilizing the first EGR assembly 36. The temperature set points for $T_1$, $T_2$ can be set individually for each engine operating condition. FIG. 2 shows four different engine operating points. For the two operating points B and D, the temperature $T_1$ may be controlled to a set point and temperature $T_2$ may float. For the two operating points A and C, the temperature $T_2$ may be controlled to a set point, and temperature $T_1$ may float. The temperatures of the gas in the system 10 at various locations are controlled by actuating the first EGR valve 38 and the bypass valve 50.

The flow of exhaust gas through the first EGR assembly 36 may be controlled so that the compressor inlet temperature $T_1$ may be maintained within a predetermined range or to a specific set point, and likewise the compressor outlet temperature $T_2$ may be maintained within a predetermined range or to a specific set point. For example, the temperature $T_1$ may be controlled within a range of 50° C. to about 100° C. or to a set point of about 70° C. Likewise, the compressor outlet temperature $T_2$ may be controlled to a range of about 100° C. to about 200° C. or to a set point of about 150° C. By controlling the flow through the first EGR assembly 36, condensation of the low pressure exhaust gas recirculation fraction coming out of the exhaust gas recirculation cooler 42 in the mixing area in front of the compressor 62 may be eliminated or substantially reduced.

Referring again to FIG. 1, the non-cooled exhaust gas recirculation fraction passing through the bypass line 48 is mixed first with fresh air entering through opening 24. The mixing takes place in the intake conduit 22 upstream of the connection of the first primary EGR line 40 which includes cooled exhaust gas. The air intake/non-cooled exhaust gas recirculation mixture is then mixed with the cooled exhaust gas recirculation fraction passing through the exhaust gas recirculation cooler 42. This mixing takes place in the primary air intake conduit 22, but a certain distance downstream of a mixing of the non-cooled fraction from the bypass line 48 with the fresh air. The distance between the bypass conduit 48 and the primary line 40 including cooled exhaust gas is necessary to provide for adequate mixing. The calculated temperature of the mixture in the air intake conduit at all times during the mixing is above a threshold value. This threshold value is dependent upon the temperature and the absolute humidity of fluids before and at every point during mixing. These temperatures can be either estimated through maps in the ECU or measured by temperature sensors for $T_1$ and $T_A$.

The flow of exhaust gas through the first EGR assembly 36 may be controlled under a variety of circumstances and in a variety of manners. For example, the control system 82 may receive inputs related to temperatures $T_0$, $T_A$, $T_B$, $T_C$, $T_D$, $T_1$ or engine speed or load. In response thereto, the controller 82 output may cause the low-pressure first EGR valve 38 to open to allow exhaust gas to flow through the first EGR assembly 36. The bypass valve 50 may be controlled to split exhaust gas flow between gas traveling through the cooler 42 and gas through the bypass line 48.

In one embodiment of the invention, the amount of exhaust gas fraction flowing through the cooler 42 is limited until the coolant temperature flowing through the cooler 42 exceeds a certain value. The exhaust gas recirculation fraction limit will allow estimating the amount of condensate coming out of the cooler 42. The amount of condensate coming out of the cooler 42 is, but is not limited to, a function of the coolant temperature in the exhaust gas recirculation cooler 42, the exhaust gas recirculation mass flow rate and the absolute humidity of the exhaust gas. As such, in one embodiment of the invention, the controller system 82 may receive an input regarding the coolant temperature of the cooler 42, for example from a coolant sensor 84 constructed and arranged to measure the temperature or estimate the temperature of the coolant in the cooler 48. The controller system 82 would provide an output causing the low-pressure first EGR valve 38 to move to control the low-pressure exhaust gas mass flow rate traveling through the first EGR assembly 36 and cause the bypass valve 50 to move to a position to split the flow of exhaust gas through the bypass line 48 and through the cooler 42.

Figure 3:
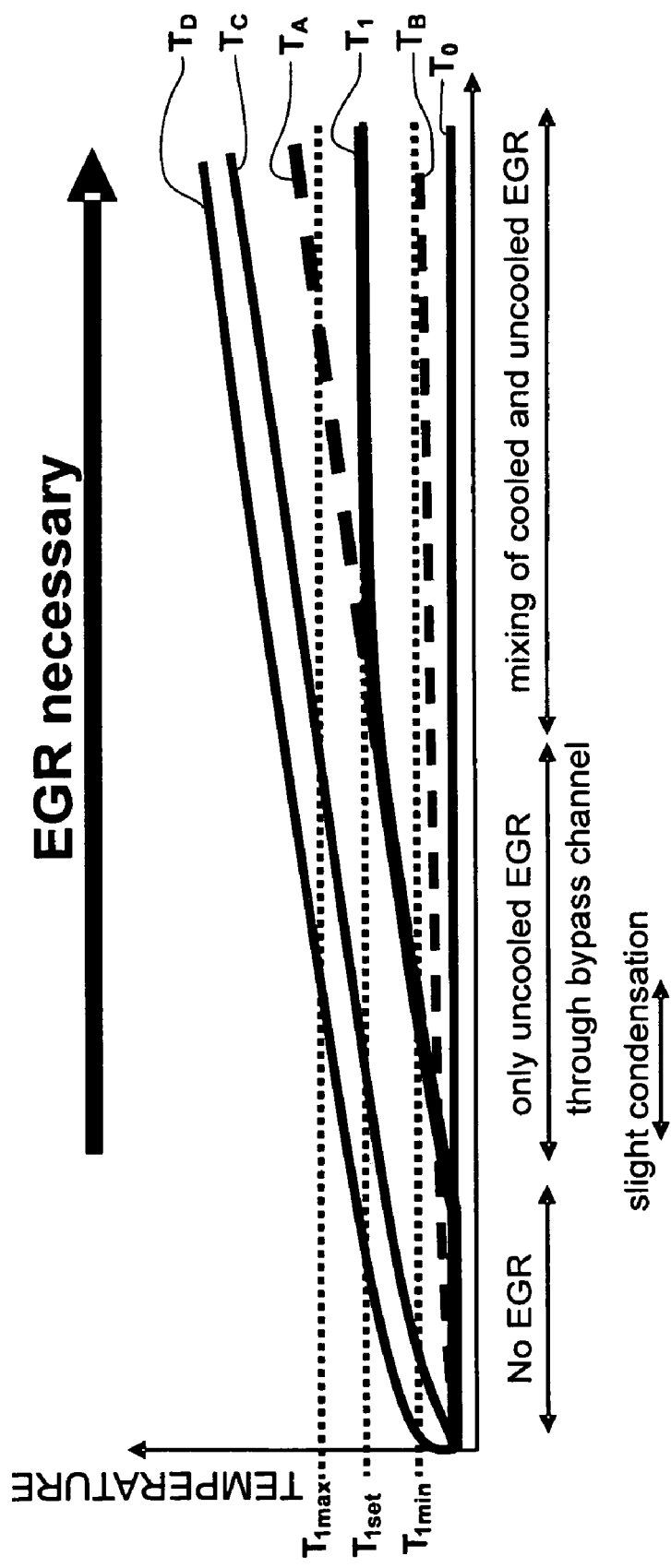
FIG. 3 is a graph illustrating the change in temperatures at various locations within a system according to one embodiment of the invention and a method of controlling the temperature of gas in the system just before the compressor by utilizing cooled and non-cooled exhaust gas recirculation according to one embodiment of the invention.

Another embodiment of the invention includes a method of limiting the intake temperatures $T_A$ and $T_1$ within certain boundaries $T_{Amin}$, $T_{1min}$, $T_{1max}$, for example as illustrated in FIG. 3. The flow of exhaust gas through the bypass line 48 is controlled so that the estimated temperature $T_A$ after mixing the non-cooled exhaust gas with the fresh air entering through opening 24 has reached a minimum value $T_{Amin}$. The minimum value of $T_{Amin}$ may vary depending upon operating condition of the system, including actual sensed or mapped based values of various operating conditions. Maintaining $T_A$ at a minimum value can help reduce condensation during mixing of the low-pressure exhaust gas fraction passing through the cooler 42. The function of maintaining $T_A$ at a minimum can be overruled by the constraint of limiting the compressor inlet temperature $T_1$ to its maximum value of $T_{1max}$. In such a case, cooled low-pressure exhaust gas recirculation flowing through the cooler 42 may be controlled to keep $T_1$ below $T_{1max}$ by controlling the bypass valve 50. The amount of cooled exhaust gas flowing through the cooler 42 may be controlled to keep temperature $T_1$ (measured or estimated from the exhaust gas recirculation rate, $T_A$ and $T_B$) equal to or less than $T_{1max}$ (map based value, which may be a function of exhaust gas recirculation rate, $T_A$ and $T_B$). This can help minimize or avoid condensation during mixing of the cooled low-pressure exhaust gas fraction flowing through the cooler 42 and into the primary air intake conduit 22. The bypass valve 50 may be controlled to prevent exhaust gas from flowing through the cooler 42 until the cooler water temperature, which in one embodiment, may be estimated from the engine water temperature, is above a predetermined value $Z°$ C.

In another embodiment, the flow of exhaust gas through the cooler 42 and through the bypass line 48 is controlled so that a certain value $T_{1set}$ (set point temperature before the compressor 62) can be achieved. $T_{1set}$ can be, but is not limited to, a function of engine speed and load and can be a consequence of temperature limits of the components of the system 10.

In another embodiment, the flow of exhaust gas through the cooler 42 and the bypass line 48 may be controlled so that a certain value $T_{2set}$ (set point temperature after the compressor 62) is achieved. The value $T_{2set}$ can be, but is not limited to, a function of engine speed and load and can be a consequence of temperature limitations on the components in the system 10. The values of $T_{1set}$ and $T_{2set}$ may vary over the engine speed and load map. Using the bypass line 48 connected to the primary air intake conduit 22 at a first position to inject non-cooled exhaust gas upstream of the injection of cooled exhaust gas (passing through the cooler 42) allows the gas temperature to be adjusted quickly to achieve desired temperatures for $T_1$ and $T_2$. Although the flow of coolant through the cooler 42 could be varied to eventually change the temperature at $T_1$ and $T_2$, such an adjustment may result in a change of $T_1$ and $T_2$, but only over a substantially lengthy period of time. Furthermore, reducing the flow of coolant through the cooler 42 may result in the undesirable boiling of the coolant. In contrast, the temperatures $T_1$ and $T_2$ can be increased rather rapidly by increasing the flow rate of exhaust gas through the bypass line 48 or decreased by restricting or preventing the flow of exhaust gas through the bypass line 48 and only allowing flow through the cooler 42.

The above description of embodiments of the invention is merely exemplary in nature and, thus, variations thereof are not to be regarded as a departure from the spirit and scope of the invention.

What is claimed is:

1. A product comprising:
   a primary air intake conduit in communication with a combustion engine;
   a primary exhaust gas conduit in communication with the combustion engine;
   a turbocharger having a turbine in fluid communication with the primary exhaust gas conduit and having a compressor in fluid communication with the primary air intake conduit;
   a first primary exhaust gas recirculation line in fluid communication with the primary exhaust gas conduit, the first primary exhaust gas recirculation line having a first exhaust gas cooler and being constructed and arranged to be connected to the primary air intake conduit at a second location; and
   a bypass line constructed and arranged to provide a flow path for recirculation exhaust gas around the first exhaust gas cooler, the bypass line having a first end constructed and arranged to be connected to the primary air intake conduit at a first location;
   wherein the second location is located downstream of the first location with respect to the direction of flow of gases in the primary air intake conduit, and the compressor is located downstream of the second location, and wherein the first location is spaced a sufficient distance from the second location so that non-cooled combustion engine exhaust gas discharged from the bypass line into the primary air intake conduit has sufficient time to mix before mixing with cooled combustion engine exhaust gas passing through the first exhaust gas cooler and discharged into the primary air intake conduit so that condensation in the gas traveling through the primary air intake conduit at a location before the compressor is substantially eliminated.

2. A method of operating a breathing system for a combustion engine comprising:
providing a turbocharger compressor in fluid communication with a primary air intake conduit;
selectively injecting non-cooled combustion engine exhaust gas into the primary air intake conduit at a first location;
selectively injecting cooled combustion engine exhaust gas into the primary air intake conduit at a second location that is downstream of the first location with respect to the direction of gas flow in the primary air intake conduit and that is upstream of the turbocharger compressor; and
controlling the amount of non-cooled combustion engine exhaust gas and cooled combustion engine exhaust gas being injected into the primary air intake conduit in response to the difference between the temperature of gas flowing through the primary air intake conduit at a location upstream of the turbocharger compressor and a first predetermined temperature set point, or in response to the difference between the temperature of gas flowing through the primary air intake conduit at a location downstream of the turbocharger compressor and a second predetermined set point.

3. A method of operating a breathing system for a combustion engine comprising:
providing a turbocharger compressor in fluid communication with a primary air intake conduit;
selectively injecting non-cooled combustion engine exhaust gas into the primary air intake conduit at a first location;
selectively injecting cooled combustion engine exhaust gas into the primary air intake conduit at a second location that is downstream of the first location with respect to the direction of gas flow in the primary air intake conduit and that is upstream of the turbocharger compressor;
controlling the amount of non-cooled combustion engine exhaust gas and cooled combustion engine exhaust gas being injected into the primary air intake conduit so that the temperature of gas at a location between the first location and the second location is above a minimum predetermined value and so that the temperature of gas in the primary air intake conduit at a location just before the turbocharger compressor is equal to or less than a maximum predetermined value; and
preventing the injecting of cooled combustion engine exhaust gas into the primary air intake conduit and only allowing non-cooled combustion engine exhaust gas to be injected into the primary air intake conduit until the temperature of gas at the location between the first location and the second location has reached a predetermined value, but only if the temperature of gas in the primary air intake conduit at the location just before the turbocharger compressor is equal to or less than the maximum predetermined value.

4. A product comprising:
a first primary exhaust gas recirculation line and a first exhaust gas cooler in fluid communication with the first primary exhaust gas recirculation line;
a bypass line constructed and arranged to provide a flow path for recirculation exhaust gas around the cooler;
and wherein the bypass line includes a first end constructed and arranged to be connected to a primary air intake conduit at a first location, and wherein the first primary exhaust gas recirculation line is constructed and arranged to be connected to the primary air intake conduit at a second location downstream from the first location and wherein the bypass line includes a second end constructed and arranged to be connected to the first primary exhaust gas recirculation line.

5. A product as set forth in claim 4 further comprising a bypass valve in the first primary exhaust gas recirculation line upstream of the first cooler and wherein the bypass line includes a second end connected to the bypass valve.

6. A product as set forth in claim 4 further comprising an exhaust gas recirculation valve connected to the first primary exhaust gas recirculation line.

7. A product as set forth in claim 4 further comprising a primary air intake conduit connected to the first primary exhaust gas recirculation line and to the bypass line.

8. A product as set forth in claim 4 further comprising a primary exhaust gas conduit connected to the first primary exhaust gas recirculation line.

9. A product as set forth in claim 4 further comprising a primary air intake conduit connected to the bypass line at the first location and to the first primary exhaust gas recirculation line at the second location, and a primary exhaust gas conduit connected to the first primary exhaust gas recirculation conduit, and a turbocharger having a turbine in fluid communication with the primary exhaust gas conduit and a compressor in fluid communication with the primary air intake conduit, and wherein the compressor is downstream from the second location and wherein the first location is spaced a sufficient distance from the second location so that non-cooled exhaust air discharged from the bypass line into the primary air intake line has sufficient time to mix prior to mixing with cooled exhaust gas passing through a cooler connected to the first primary exhaust gas recirculation line and injected into the primary air intake conduit so that condensation in the gas traveling through the primary air intake line prior to the compressor is substantially eliminated.

10. A product as set forth in claim 4 further comprising a primary air intake conduit connected to the first primary exhaust gas recirculation line and to the bypass line, and a primary exhaust gas conduit connected to the first primary exhaust gas recirculation line, so that the first exhaust gas recirculation assembly provides for high pressure recirculation of exhaust gas.

11. A method of operating a breathing system for a combustion engine comprising:
selectively injecting non-cooled combustion engine exhaust gas into a primary air intake conduit at a first location;
selectively injecting cooled combustion engine exhaust gas into the primary air intake conduit at a second location; and wherein the second location is downstream of the first location with respect to the direction of flow of gases in the primary air intake conduit, and both the first and second locations are located upstream of a turbocharger compressor or both the first and second locations are located downstream of a turbocharger compressor.

12. A method as set forth in claim 11 further comprising controlling the amount of non-cooled exhaust gas and cooled exhaust gas injected into the primary air intake conduit so that the gas flowing in the primary air intake conduit at a position downstream of the second location is substantially free of condensation.

13. A method as set forth in claim 11 further comprising a first exhaust gas recirculation assembly comprising a first primary exhaust gas recirculation line and a first exhaust gas cooler in fluid communication with the first primary exhaust gas recirculation line and constructed and arranged to cool exhaust gas flowing through the first primary exhaust gas recirculation line, and further comprising a bypass line constructed and arranged to bypass the first cooler, and further comprising at least one valve constructed and arranged to control the flow of exhaust gas through the first cooler and through the bypass line and wherein the first primary exhaust gas recirculation line is constructed and arranged to inject the cooled exhaust gas into the primary air intake conduit at the second location and wherein the bypass line is constructed and arranged to inject the non-cooled exhaust gas into the primary air intake conduit at the first location upstream of the second location.

14. A method as set forth in claim 13 further comprising flowing a coolant through the first cooler to cool the exhaust gas flowing therethrough, and further comprising controlling the first valve in response to the measured or estimated temperature of the coolant flowing through the first cooler.

15. A method as set forth in claim 13 further comprising a controller system and a first exhaust gas recirculation valve constructed and arranged to control the amount of flow through the first exhaust gas recirculation assembly and further comprising controlling at least one of the first exhaust gas recirculation valve or the first valve in response to at least one of the measured or estimated engine speed or engine load, coolant temperature, exhaust gas constituent concentration, fresh air intake temperature, temperature of the exhaust flowing in the primary air intake conduit prior to the compressor, the temperature of the gas in the primary air intake conduit at a location after the compressor, the temperature of the gas in the air intake conduit at a location between the first location and the second location, a temperature of the gas in the primary line after the cooler, temperature of the gas in the bypass line, temperature of the gas in the primary line prior to the first valve, or temperature of the gas in the primary exhaust gas conduit prior to the exhaust gas recirculation valve.

16. A method as set forth in claim 11 wherein the first and second locations are located upstream of the turbocharger compressor.

17. A method as set forth in claim 16 further comprising controlling the amount of non-cooled exhaust gas and cooled exhaust gas injected into the primary air intake conduit so that the temperature of the gas flowing in the primary air intake conduit just before the compressor is within a predetermined range.

18. A method as set forth in claim 16 further comprising controlling the amount of non-cooled exhaust gas and cooled exhaust gas injected into the primary air intake conduit in response to the difference between the temperature of gas flowing through the primary air intake conduit at a location upstream of the compressor and a predetermined temperature set point.

19. A method as set forth in claim 16 further comprising controlling the amount of non-cooled exhaust gas and cooled exhaust gas injected into the primary air intake conduit so that the temperature of the gas at a location after the compressor is within a predetermined range.

20. A method as set forth in claim 16 further comprising controlling the amount of non-cooled exhaust gas and cooled exhaust gas injected into the primary air intake conduit in response to the difference between the temperature of the gas in the primary air intake conduit at a location downstream of a compressor and a predetermined temperature set point.

21. A method as set forth in claim 16 further comprising preventing the injecting cooled combustion exhaust gas into the primary air intake conduit and only injecting non-cooled combustion exhaust gas to be injected into the primary air intake conduit until the temperature of the gas in the primary air intake conduit at a location between the first position and the second position has reached a minimum predetermined value.

22. A method as set forth in claim 16 further comprising preventing the injecting cooled combustion exhaust gas into the primary air intake conduit and only injecting non-cooled combustion exhaust gas to be injected into the primary air intake conduit until the temperature of the gas in the primary air intake conduit at a location between the first location and the second location has reached a predetermined value, but only if the temperature of the gas in the primary air intake conduit just prior to the compressor is equal to or less than a maximum predetermined value.

23. A method as set forth in claim 16 further comprising controlling the amount of non-cooled combustion exhaust gas and cooled combustion exhaust gas injected into the primary air intake conduit so that the temperature of the gas at a location between the first location and the second location is above a minimum predetermined value and so that the temperature of the gas in the primary conduit at a location just prior to the compressor is equal to or less than a maximum predetermined value.

\* \* \* \* \*